United States Patent [19]

Andrews et al.

[11] Patent Number: 4,886,401

[45] Date of Patent: Dec. 12, 1989

[54] DIVERTER ASSEMBLY FOR RADIOACTIVE MATERIAL

[75] Inventors: Katherine M. Andrews, Pittsburgh; Robert W. Starenchak, Youngwood, both of Pa.

[73] Assignee: The United States of America as represented by the United States Department of Energy, Washington, D.C.

[21] Appl. No.: 179,922

[22] Filed: Apr. 11, 1988

[51] Int. Cl.$^4$ .............................................. B65G 51/24
[52] U.S. Cl. ................................. 406/182; 376/264; 376/270; 193/23
[58] Field of Search ............... 406/155, 156, 164–167, 406/181, 182; 193/23, 29, 31 A; 376/264, 265, 270

[56] References Cited

U.S. PATENT DOCUMENTS

| | | | |
|---|---|---|---|
| 2,756,858 | 7/1956 | Kasschau | 376/270 |
| 3,122,485 | 2/1964 | Clauson | 176/30 |
| 3,205,142 | 9/1965 | Greaves et al. | 176/30 |
| 3,674,123 | 7/1972 | Lewis et al. | 193/23 |
| 3,874,490 | 4/1975 | McAlister | 193/23 |
| 4,063,572 | 12/1977 | Anbderegg et al. | 406/182 X |
| 4,133,418 | 1/1979 | Van Bilderbeek | 193/23 |
| 4,692,628 | 9/1987 | Saverwein et al. | 406/182 X |

FOREIGN PATENT DOCUMENTS

| | | | |
|---|---|---|---|
| 1259776 | 1/1968 | Fed. Rep. of Germany | 406/182 |
| 0695924 | 11/1979 | U.S.S.R. | 406/182 |
| 1382347 | 1/1975 | United Kingdom | 406/182 |
| 2162141 | 1/1986 | United Kingdom | 406/182 |

Primary Examiner—Joseph F. Peters, Jr.
Assistant Examiner—Paul E. Salmon
Attorney, Agent, or Firm—William W. Randolph; William R. Moser; Richard E. Constant

[57] ABSTRACT

A diverter assembly for diverting a pneumatically conveyed holder for a radioactive material between a central conveying tube and one of a plurality of radially offset conveying tubes includes an airtight container. A diverter tube having an offset end is suitably mounted in the container for rotation. A rotary seal seals one end of the diverter tube during and after rotation of the diverter tube while a spring biased seal seals the other end of the diverter tube which mvoes between various offset conveying tubes. An indexing device rotatably indexes the diverter tube and this indexing device is driven by a suitable drive. The indexing mechanism is preferably a geneva-type mechanism to provide a locking of the diverter tube in place.

6 Claims, 3 Drawing Sheets

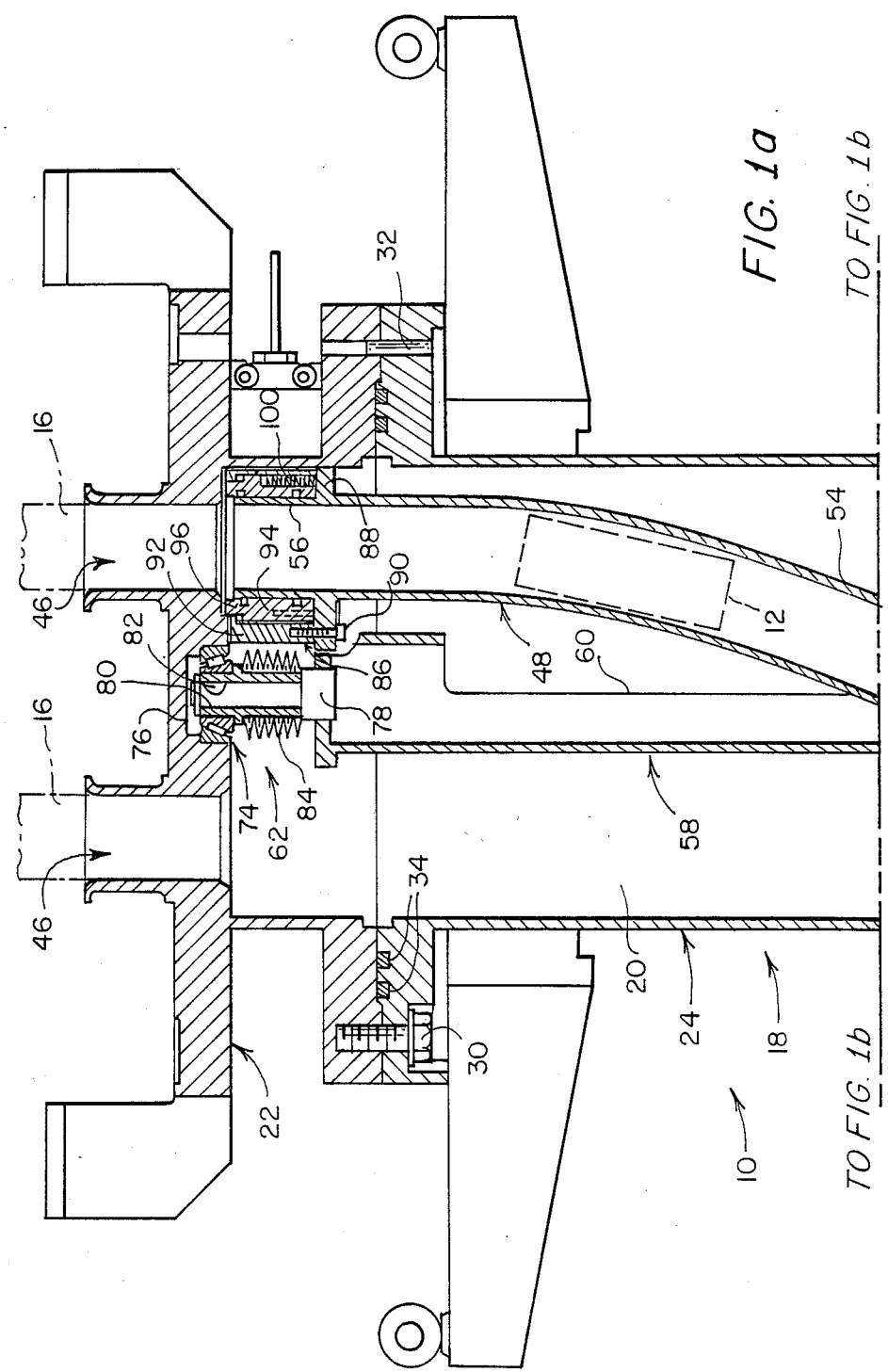

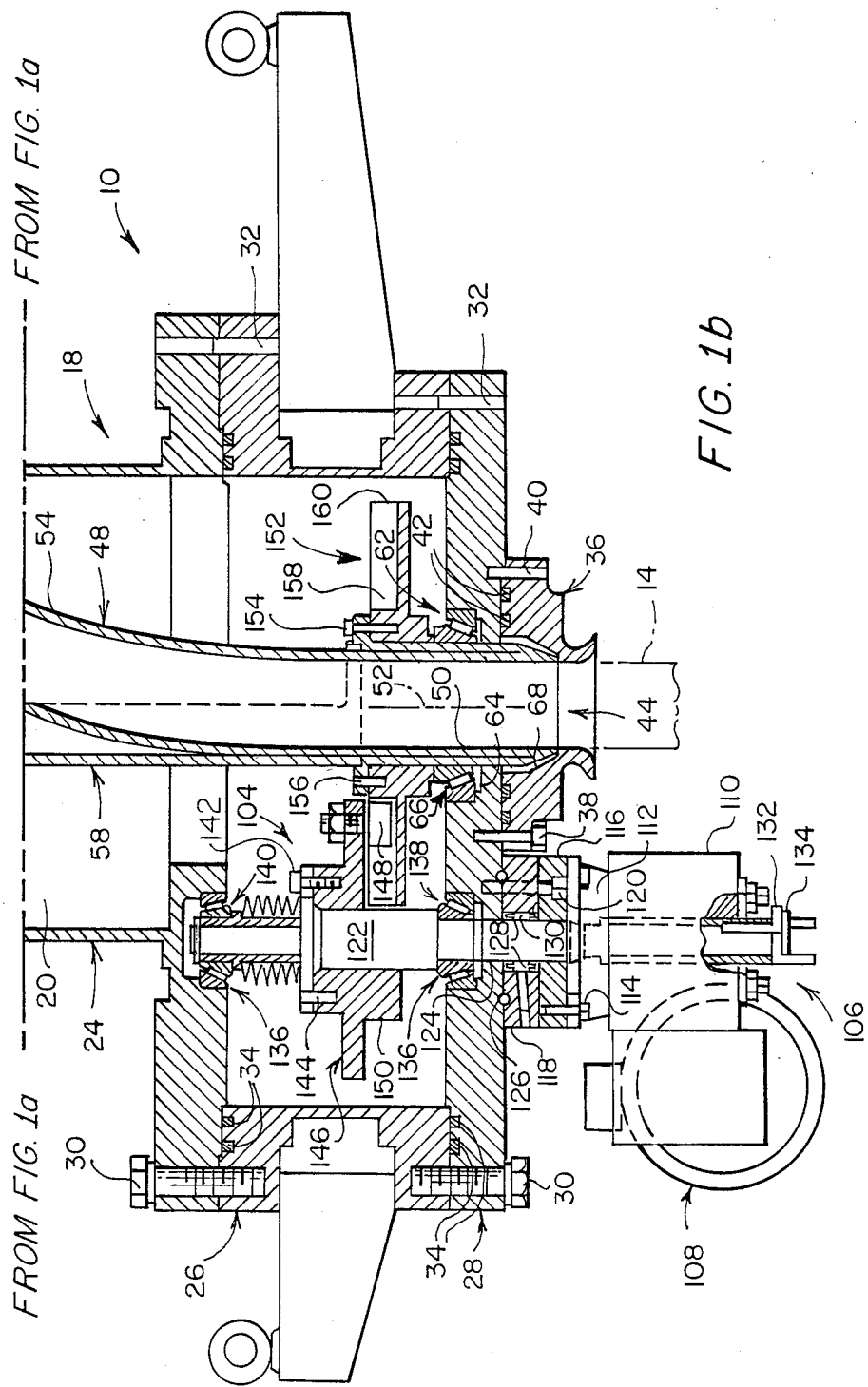

DIVERTER ASSEMBLY FOR RADIOACTIVE MATERIAL

FIELD OF THE INVENTION

The present invention relates generally to a diverter assembly, and more particularly to a diverter assembly for diverting a pneumatically conveyed holder of radioactive material between a central conveying tube and one of a plurality of radially offset conveying tubes.

BACKGROUND OF THE INVENTION

Diverter assemblies are in use today in various commerical activities. For example, hospitals typically transport blood and X-rays in carriers. Test samples are also typically delivered by a pneumatic system to laboratories for analysis. Mail is further distributed to different departments through the use of pneumatic transports and a diverter. Most diverter systems are driven with a chain and sprocket, with alignment accuracies of between 1/16 and ⅛ inch. Pressurized systems lead to leakage from the pneumatic system to the surrounding environment. Due to this leakage, such commercial units do not meet the exacting requirements of the nuclear industry when transporting radioactive materials, other than very low radiation materials.

A through the flowline diverter assembly is disclosed in U.S. Pat. No. 4,133,418 (Van Bilderbeek). This diverter assembly accurately positions a diverter with respective angular spaced flowline ports by means of a cam and follower system. The diverter assembly is sealed at both ends after an axial and rotational indexing movement.

A switching assembly for an air classifier for delivering classified particles to selected bins pneumatically is disclosed in U.S. Pat. No. 3,874,490 (McAlister). An airtight seal is provided at an inlet to the switching station pipe and at the outlet from the switching station to one of a selected number of chutes.

In U.S. Pat. No. 3,122,485 (Clauson), a servicing mechanism for a gas-cooled nuclear reactor is disclosed. The nuclear reactor is of the type having a core formed with channels to be accessed. The servicing mechanism includes a charge tube extending through the pressure vessel which has an offset end portion. The end portion is selectively positionable at predetermined positions of the channels both radially and rotationally to provide access to the selected channel from outside of the pressure vessel.

Another charging apparatus for a nuclear reactor is disclosed in U.S. Pat. No. 3,205,142 (Greaves et al.). The disclosed charging apparatus includes a rotatable charge tube mounted in an access duct. The chute has a moveable flap whereby two radially different fuel channels at the same rotational position can be selectively accessed. The chute is also selectively rotatable.

A pig diverter for delivering a selected tool into a central piping is disclosed in U.S. Pat. No. 3,674,123 (Lewis et al.). A chute on a rotor is selectively alignable with a number of angularly located secondary tubes, one of which the tool is then passed through. A locking means is provided for locking the rotor into a selected aligned position for the selected secondary pipe.

SUMMARY OF THE INVENTION

In accordance with the present invention, a diverter assembly for diverting a pneumatically conveyed holder for radioactive material between a central conveying tube and one of a plurality of radially offset conveying tubes is provided. The diverter assembly includes an airtight container having a hollow interior. A first aperture in the container is provided about which the central tube is connected. in addition, a respective plurality of second apertures about which respective offset tubes are connected are further provided. A diverter tube is located in the container and has a first end immediately adjacent the first aperture and a second end offset a distance equal to the radial offset of the offset tubes from the central tubes. The diverter tube has a sinuous central portion connecting the first and second ends so that the holder is easily conveyed through the diverter tube. A first mounting means is provided in the container for mounting the diverter tube for rotation about a longitudinal axis of the first end so that the second end is selectively brought into alignment with respective second apertures. A rotary seal means seals the first end of the diverter tube from the interior of the container during and after rotation of the diverter tube. A spring biased seal means also seals the second end of the diverter tube from the interior of the container after rotation of the diverter tube to a selected second aperture. An indexing means rotatably indexes the second end of the diverter tube to a selected one of the second apertures. This indexing means is located in the container. A drive means for selectively driving the indexing means is further provided.

In a preferred embodiment, the spring biased seal means includes a sealing collar located about the second end of the diverter tube. A spring then urges the sealing collar against a portion of the container surrounding the selected second aperture.

In the preferred embodiment, the drive means includes a motor which is mounted to an outside of the container adjacent a passage in the container. A drive shaft for the motor passes through the passage to the indexing means. A passage seal is then provided in the passage for sealing the inside of the container.

Also in the preferred embodiment, the indexing means includes a geneva wheel attached to the diverter tube. This geneva wheel has a plurality of radial slots and a concave cam surface between the slots. A geneva disk is then attached to the drive means. The geneva disk has a depending pin for engaging a selected slot and a depending convex cam surface around both sides of the pin. Thus, when the pin is not located in one of the radial slots, a portion of the convex cam surface is immediately adjacent a respective concave surface to lock the geneva wheel in place and hence to lock the second end of the diverter tube adjacent a respective selected offset conveying tube.

It is an object of the present invention to provide a safe and efficient manner for transporting samples used in radioactive testing.

It is also an object of the present invention to provide a high precision machining and indexing so as to attain a precise alignment tolerance of +/−0.010 inch.

It is a further object of the present invention to provide a leak-tight diverter assembly to prevent any inadvertent spread of radioactive materials.

Other features and objects of the present invention are stated in or apparent from a detailed description of a presently preferred embodiment of the invention found hereinbelow.

BRIEF DESCRIPTION OF THE DRAWINGS

FIGS. 1a and 1b are respective upper and lower front elevation views in cross section of a diverter assembly according to the present invention.

FIG. 3 is an enlarged view of a portion of the diverter assembly depicted in FIG. 1a.

DETAILED DESCRIPTION OF THE PREFERRED EMBODIMENT

Figure 2:
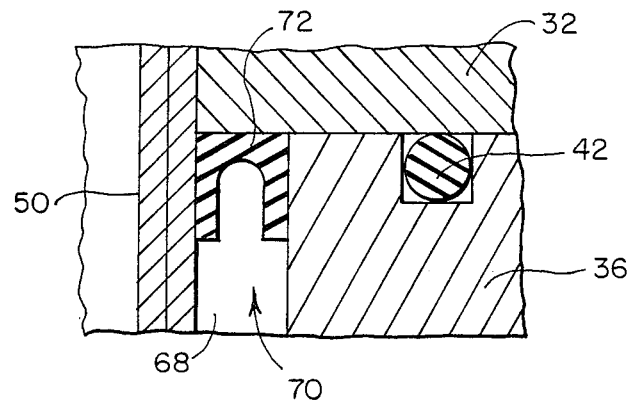
FIG. 2 is an enlarged view of a portion of the diverter assembly depicted in FIG. 1b.
Figure 3:
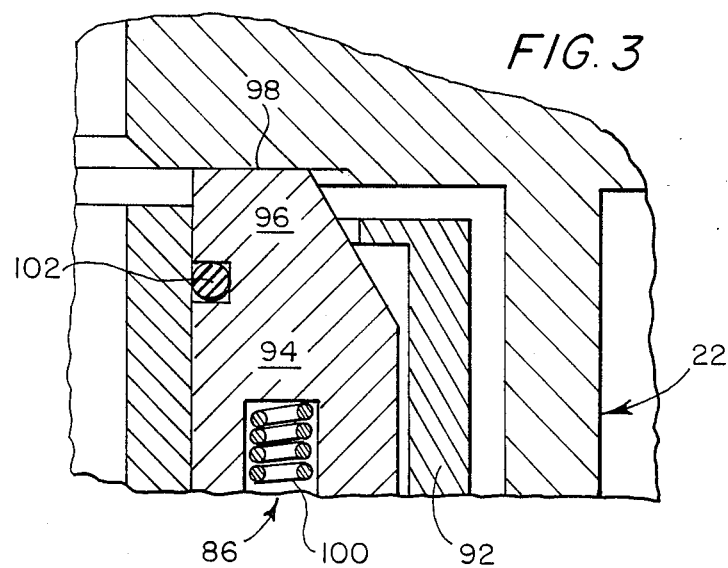

With reference now to the drawings in which like numerals represent like elements, a diverter assembly 10 is depicted in FIGS. 1a and 1b. Diverter assembly 10 is used for transporting a holder 12 (shown in phantom) of a radioactive material which is pneumatically conveyed between a central conveying tube 14 (shown in phantom) and one of a plurality of radially offset conveying tubes 16 (shown in phantom). In this preferred embodiment, there are six such offset conveying tubes (only two of which are shown) located about a pitch circle having a center coincident with the longitudinal axis of central conveying tube 14.

Diverter assembly 10 includes an airtight container 18 having a hollow interior 20. As shown, container 18 is formed by an upper plate 22, an upper body 24, a lower body 26, and a bottom plate 28. Upper plate 22, upper body 24, lower body 26, and bottom plate 28 all have mating surfaces with an adjacent element. These elements are located by respective pins 32 and held together by a plurality of respective bolts 30. In addition, in order to make hollow interior 20 of cylindrical container 18 airtight, respective O-rings 34 are provided between the mating surfaces. Typically, in order to compress O-rings 34 uniformly, twelve bolts 30 are provided circumferentially around O-rings 34 at each mating surface which are appropriately located by two pins 32.

Attached to bottom plate 28 is a bottom flange 36. The mating surfaces between bottom flange 36 and bottom plate 28 are held in contact with suitable bolts 38 and located by pins 40. In addition, suitable O-rings 42 are provided between the mating surfaces to seal the mating surfaces.

As described above, container 18 is airtight, with the exception of an aperture 44 in bottom flange 36 and bottom plate 28 about which central conveying tube 14 is suitably attached in an airtight manner. At the other end, container 18 includes six apertures 46 (only two of which are shown) about which respective offset conveying tubes 16 are suitably attached in an airtight manner.

Mounted within container 18 is a diverter tube 48 having a generally sinuous shape. Diverter tube 48 has a lower end 50 provided with a longitudinal axis 52 coincident with the longitudinal axis of central conveying tube 14. Diverter tube 48 also includes a sinuous central portion 54 and an upper end 56. As shown, the sinuous shape of central portion 54 causes upper end 56 to be disposed at a position offset from longitudinal axis 52 the same amount by which apertures 46 and offset conveying tubes 16 are offset from central conveying tube 14. Thus, upper end 56 is positionable immediately adjacent aperture 46 as shown in FIG. 1a.

Diverter tube 48 is rotatably mounted in hollow interior 20 of container 18 by use of a mounting member 58 which is integrally formed with diverter tube 48 as shown. Mounting member 58 takes the general shape of a tube having a longitudinal axis coincident with longitudinal axis 52. However, this tubes includes an opening 60 through which diverter tube 48 extends to the offset upper end 56.

Mounting member 58 and diverter tube 48 are suitably mounted in container 18 by a mounting means 62. Adjacent lower end 50, mounting means 62 includes a recess 64 in bottom plate 28 in which a suitable roller bearing means 66 is provided. Bearing means 66 mounts lower end 50 so that lower end 50 is not in contact with bottom plate 28 or bottom flange 36. As shown, bottom flange 36 includes a chamber 68 surrounding lower end 50. Located in chamber 68 is a rotary seal means 70 in the form of a U-shaped seal member 72. Rotary seal means 70 allows lower end 50 to rotate in bottom flange 36 while preventing leakage to hollow interior 20 of container 18 from lower end 50 or central conveying tube 14.

Mounting means 62 for mounting member 58 also includes an upper bearing means 74 located in a recess 76 of upper plate 22. A suitable axle 78 is mounted in the upper end of mounting member 58 about which a sleeve 80 is located. Sleeve 80 is held on axle 78 by a suitable retaining ring and is rotatably held on axle 78 by suitable key 82. Sleeve 80 includes a suitable shoulder so that spring washers 84 are located between the shoulder and a lower shoulder on axle 78 to urge sleeve 80 into precise alignment with upper bearing means 74. It should be appreciated that both bearing means 66 and 74 preferably include a bearing cup, rollers, and a bearing cone typical of such bearing means.

A spring biased seal means 86 is provided on diverter tube 48 at upper end 56 thereof. Spring biased seal means 86 includes a shoulder 88 extending laterally around upper end 56 as shown. Suitably attached to shoulder 88 by bolts 90 is a circular retaining wall 92 which extends from shoulder 88 to a position short of upper plate 22. Disposed between retaining wall 92 and upper end 56 is a Teflon sealing collar 94 of generally cylindrical shape. Teflon sealing collar 94 includes an upper nose 96 which engages a suitable recess 98 provided in upper plate 22 around each aperture 46. Sealing collar 94 is urged upwardly into contact with recess 98 by a plurality of springs 100 extending out of the lower end of sealing collar 94 into pressing contact with shoulder 88. As shown, sealing collar 94 is lifted above shoulder 88 by springs 100 when in sealing contact around aperture 46.

Provided between the mating surfaces of sealing collar 94 and upper end 56 are O-rings 102. With use of sealing collar 94 and O-rings 102, seal means 86 seals interior 20 of container 18 from upper end 56, aperture 46, and offset conveying tube 16 when diverter tube is stationary. A suitable lip on the top of retaining wall 92 and a corresponding shoulder on seal member 94 retain seal member 94 between retaining wall 92 and upper end 56.

In order to rotate upper end 56 of diverter tube 48 to a selected aperture 46, an indexing means 104 located in hollow interior 20 is provided. Indexing means 104 is selectively driven by a drive means 106 located outside of hollow interior 20 on bottom plate 28. Drive means 106 includes a suitable electric motor 108 and associated reductor 110. Motor 108 and reductor 110 are mounted to a bracket 112 which is in turn mounted by bolts 114 to a motor mount 116. Motor mount 116 is then mounted below a seal retainer 118 with both motor mount 116 and seal retainer 118 being held to bottom plate 28 by suitable bolts 120 (only one of which is shown). Motor 108 is designed to selectively rotate a shaft 122 extending through a passage 124 in bottom plate 28. In order to seal aperture 124, a passage seal means in the form of an O-ring 126 is provided between the mating surfaces of bottom plate 28 and seal retainer 118. In addition, suitable U-shaped seal members 128 are provided around shaft 122 at the top and bottom of a recess 130 provided in seal retainer 118.

Shaft 122 is selectively rotatable without the use of motor 108 by the provision of a key 132 in reductor 110. Key 132 is held in place by a spring pin 134 below key 132.

Shaft 122 is mounted for rotation inside of hollow interior 20 of container 18 by a mounting means 136 similar to mounting means 62 for mounting member 58. In particular, mounting means 136 includes suitable bearing means 138 and 140 as shown.

Mounted to shaft 122 by a plurality of bolts 142 and pins 144 (only one each of which are shown) is a geneva drive disk 146. Geneva disk 146 includes a depending pin or tooth in the form of a roller 148. Extending circumferentially around geneva disk 146 from either side of roller 148 is a convex cam surface 150. Geneva disk 146 interacts with a geneva driven wheel 152 which is attached to mounting member 58 and diverter tube 48 by suitable bolts 154 and pins 156 (only one each of which are shown). Geneva wheel 152 includes six radial slots 158 (only two of which are shown). Between each radial slot is a concave cam surface 160.

As will be readily appreciated by those of ordinary skill in the art, geneva disk 146 and geneva wheel 152 provide a geneva indexing mechanism for rotating diverter tube 48 selectively from one aperture 46 to the next aperture 46 by the revolution of roller 148 on geneva disk 146. As roller 148 revolves around shaft 122, roller 148 enters a radial slot 158 on geneva wheel 152 and causes geneva wheel 152 to rotate a predetermined distance (1/6th revolution) at which point roller 148 exits radial slot 158. In this position, convex cam surface 150 is immediately adjacent concave cam surface 160 which locks geneva wheel 152 in place relative to geneva disk 146 (which continues to rotate to bring roller 148 into position to selectively engage the next radial slot 158). The use of this indexing means 104 provides a precise alignment for upper end 56 of diverter tube 48 as well as a locking of diverter tube 48 in place after movement by indexing means 104.

In operation, diverter assembly 10 functions in the following manner. Initially, it should be appreciated that central conveying tube 14 is suitably connected to aperture 44 and a plurality of offset conveying tubes 16 are connected to respective apertures 46. In the position depicted in FIGS. 1a and 1b, holder 12 for the radioactive material is conveyed between the right hand offset conveying tube 16 and central conveying tube 14.

In order to convey holder 12 between central conveying tube 14 and a different offset conveying tube 16, drive means 106 is actuated to rotate shaft 122 a desired number of revolutions. In the present embodiment where there are six offset conveying tubes, each revolution of shaft 122 moves upper end 56 of diverter tube 48 to an adjacent offset conveying tube 16. With each revolution of shaft 122, it should be appreciated that rotary seal means 70 seals lower end 50 of diverter tube 48 both during and after such a rotation. At upper end 56, as rotation begins, Teflon sealing collar 94 is pushed upward by springs 100 as upper nose 96 moves in recess 98. Near the end of the movement of roller 148 in the associated radial slot 158, upper nose 96 of Teflon sealing collar 94 remains in recess 98 of the next aperture 46. At the end of the movement of roller 148 in the associated radial slot 158, upper nose 96 remains pressed against recess 98 of the selected aperture 46 to seal upper end 56 of diverter tube 48 due to the action of springs 100.

It should be appreciated that indexing means 104 provides a precise alignment for upper end 56 of diverter tube 48 on the order of $+/-0.010$ inch. It should also be appreciated that indexing means 104 also forms a self-locking mechanism for locking diverter tube 48 and mounting member 58 in position by means of convex cam surface 150 and concave cam surface 160 during the time between movements of indexing means 104.

It should further be appreciated that hollow interior 20 of container 18 is sealed at all times during which conveying may take place so that the pneumatic conveying of holder 12 is not adversely affected. Without such seals, uncontrolled flow to or from diverter tube 48 would allow hollow interior 20 as well as the other offset conveying tubes 16 to act as reservoirs and to affect the transfer differential pressure across diverter assembly 10.

It should still further be appreciated that the leak-tight integrity of container 18 is maintained by the various buffered seals. This buffer sealing pressure is slightly above atmospheric to insure any leakage is into container 20. This prevents any undesirable spread of radioactive contamination.

Although the present invention has been described with respect to an exemplary embodiment thereof, it will be understood by those of ordinary skill in the art that variations and modifications can be effected within the scope and spirit of the invention.

We claim:

1. A diverter assembly for diverting a pneumatically conveyed holder for radioactive material between a central conveying tube and one of a plurality of conveying tubes radially offset from the central conveying tube comprising:

an airtight container having a hollow interior, a first aperture about which the central tube is connected, and a respective plurality of second apertures about which respective offset tubes are connected;

a diverter tube in said container having a first end located immediately adjacent said first aperture and a second end offset from said first end a distance equal to the radial offset of the conveying tubes from the central tube, said diverter tube having a sinuous central portion connecting said first and second ends such that the holder is easily conveyed through said diverter tube;

a first mounting means in said container for mounting said diverter tube for rotation about a longitudinal axis of said first end such that said second end is selectively brought into alignment with respective said second apertures;

a rotary seal means for sealing said first end of said diverter tube from the interior of said container during and after rotation of said diverter tube;

a spring biased seal means for sealing said second end of said diverter tube from the interior of said container during and after rotation of said diverter tube to a selected second aperture;

an indexing means for rotatably indexing said second end of said diverter tube to a selected one of said second apertures of said container, said indexing means being located in said container; and a drive means for selectively driving said indexing means, said drive means including a motor mounted to an outside of said container adjacent a passage in said container, a drive shaft for said motor passing through said passage, and a passage seal means in said passage for sealing the inside of said container.

2. A diverter assembly for diverting a pneumatically conveyed holder for radioactive material between a central conveying tube and one of a plurality of conveying tubes radially offset from the central conveying tube comprising:

an airtight container having a hollow interior, a first aperture about which the central tube is connected, and a respective plurality of second apertures about which respective offset tubes are connected;

a diverter tube in said container having a first end located immediately adjacent said first aperture and a second end offset from said first end a distance equal to the radial offset of the conveying tubes from the central tube, said diverter tube having a sinuous central portion connecting said first and second ends such that the holder is easily conveyed through said diverter tube;

a first mounting means in said container for mounting said diverter tube for rotation about a longitudinal axis of said first end such that said second end is selectively brought into alignment with respective said second apertures;

a rotary seal means for sealing said first end of said diverter tube from the interior of said container during and after rotation of said diverter tube;

a spring biased seal means for sealing said second end of said diverter tube from the interior of said container during and after rotation of said diverter tube to a selected second aperture;

an indexing means for rotatably indexing said second end of said diverter tube to a selected one of said second apertures of said container, said indexing means being located in said container, and said indexing means including (a) a geneva wheel attached to said diverter tube having a plurality of radial slots and a concave cam surface between said slots and (b) a geneva disk attached to said drive means having a depending pin for engaging a selected slot and a depending convex cam surface extending around both sides of said pin such that when said pin is not located in one of said radial slots a portion of said convex cam surface is immediately adjacent a respective said concave surface to lock said geneva wheel in place; and a drive means for selectively driving said indexing means.

3. A diverter assembly for diverting a pneumatically conveyed holder for material between a central conveying tube and one of a plurality of conveying tubes radially offset from the central conveying tube comprising:

a container having a first aperture about which the central tube is connected, and a plurality of second apertures about which respective offset tubes are connected;

a diverter tube mounted in said container and having a first end located adjacent said first aperture and a second end offset from said first end;

a mounting means in said container for mounting said diverter tube for rotation about said first end such that said second end is selectively brought into alignment with respective said second apertures;

seal means for sealing said first and second ends of said diverter tube from the interior of said container during and after rotation of said diverter tube;

an indexing means for rotatably indexing said second end of said diverter tube to a selected one of said second apertures of said container; and a drive means for selectively driving said indexing means, said drive means including a motor mounted to an outside of said container adjacent a passage in said container, a drive shaft for said motor passing through said passage, and a passage seal means in said passage for sealing the inside of said container.

4. A diverter assembly as claimed in claim 3 wherein said spring biased seal means includes a sealing collar located about said second end of said diverter tube and a spring for urging said sealing collar against a portion of said container surrounding said selected second aperture.

5. The diverter assembly of claim 3, wherein said indexing means includes (a) a geneva wheel attached to said diverter tube having a plurality of radial slots and a concave cam surface between said slots and (b) a geneva disk attached to said drive means having a depending pin for engaging a selected slot and a depending convex cam surface extending around both sides of said pin such that when said pin is not located in one of said radial slots a portion of said convex cam surface is immediately adjacent a respective said concave surface to lock said geneva wheel in place.

6. A diverter assembly for diverting a pneumatically conveyed holder for material between a central conveying tube and one of a plurality of conveying tubes radially offset from the central conveying tube comprising:

a container having a first aperture about which the central tube is connected, and a plurality of second apertures about which respective offset tubes are connected;

a diverter tube mounted in said container and having a first end located adjacent said first aperture and a second end offset from said first end;

a mounting means in said container for mounting said diverter tube for rotation about said first end such that said second end is selectively brought into alignment with respective said second apertures;

seal means for sealing said first and second ends of said diverter tube from the interior of said container during and after rotation of said diverter tube;

an indexing means for rotatably indexing said second end of said diverter tube to a selected one of said second apertures of said container, said indexing means being located in said container, said indexing means including (a) a geneva wheel attached to said diverter tube having a plurality of radial slots and a concave cam surface between said slots and (b) a geneva disk attached to said drive means having a depending pin for engaging a selected slot and a depending convex cam surface extending around both sides of said pin such that when said pin is not located in one of said radial slots a portion of said convex cam surface is immediately adjacent a respective said concave surface to lock said geneva wheel in place; and a drive means for selectively driving said indexing means.

* * * * *